June 26, 1962 J. SAVAGE 3,041,593
POSITIVE ALARM LOCK
Filed March 9, 1961 3 Sheets-Sheet 1
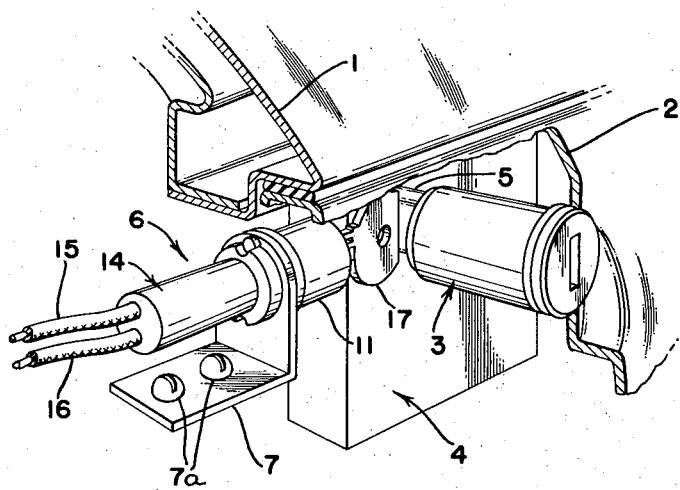
FIG. 1
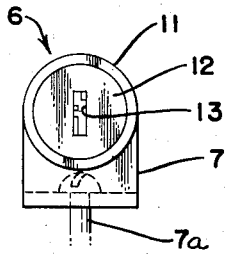
FIG. 3
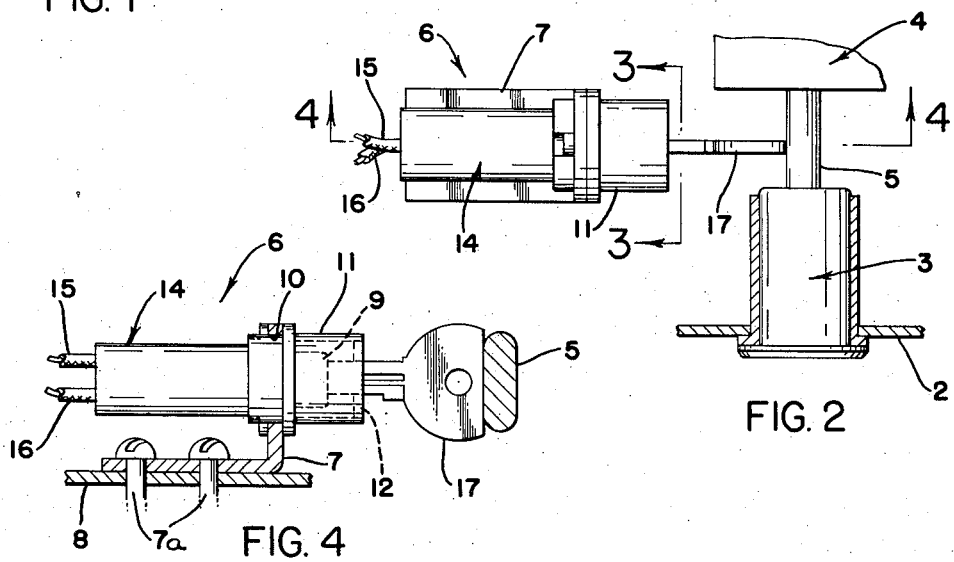
FIG. 2
FIG. 4
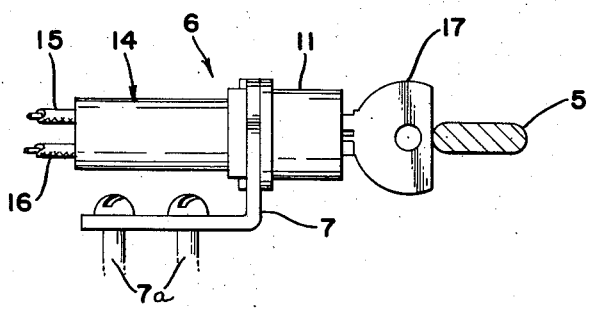
FIG. 5
*INVENTOR.*
JOSEPH SAVAGE
BY
*Fay & Fay*
ATTORNEYS June 26, 1962  J. SAVAGE  3,041,593
POSITIVE ALARM LOCK
Filed March 9, 1961  3 Sheets-Sheet 2
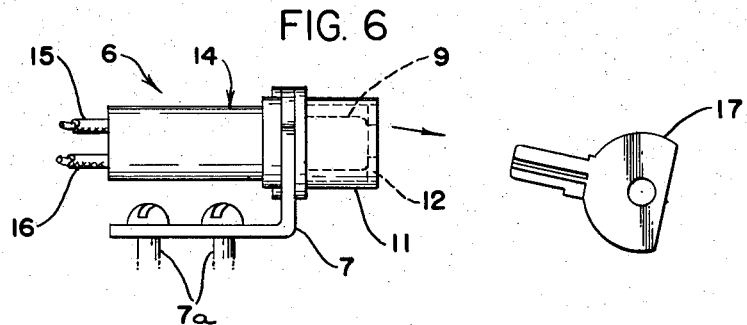
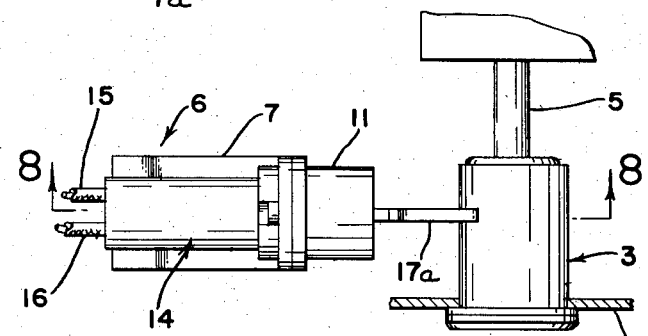
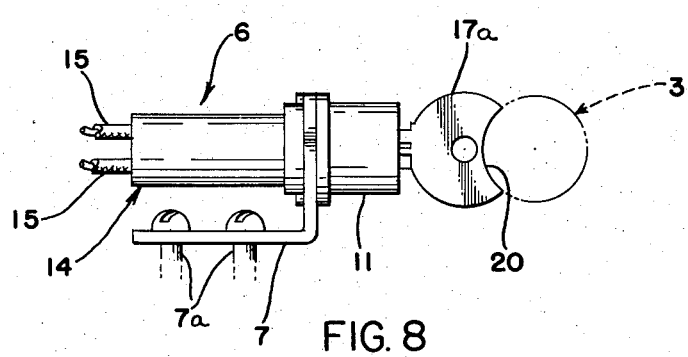
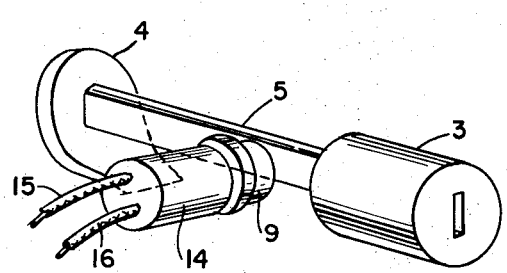
INVENTOR.
JOSEPH SAVAGE
BY
*Fay & Fay*
ATTORNEYS June 26, 1962  J. SAVAGE  3,041,593
POSITIVE ALARM LOCK
Filed March 9, 1961  3 Sheets-Sheet 3

INVENTOR.
JOSEPH SAVAGE
BY
*Fay & Fay*
ATTORNEYS

United States Patent Office 3,041,593
Patented June 26, 1962

3,041,593
POSITIVE ALARM LOCK
Joseph Savage, 8314 Euclid Ave., Cleveland 3, Ohio
Filed Mar. 9, 1961, Ser. No. 94,628
11 Claims. (Cl. 340—274)

This invention relates to an alarm mechanism and is particularly useful in discouraging or preventing altogether thefts from parked automotive vehicles.

In the past few years the theft of spare tires and other items from automobile trunks has become an increasingly serious problem. In an average large city, the annual number of such thefts has reached a disturbingly high figure. Both automotive manufacturers and law enforcement agencies for some time have displayed an interest in the development of an alarm mechanism for use with automotive vehicles in the hope that such a mechanism would cause a decrease in the number of such thefts.

Several alarm devices have been proposed in the past but usually such devices were too complicated or too expensive to appeal either to the manufacturer or to the ultimate consumer.

Consequently no alarm mechanism has been adopted on a large scale with the result that thefts continue at a high rate.

The alarm mechanism which I have disclosed in my copending United States application, Serial No. 32,412, filed May 27, 1960, represents a significant advance in the automotive alarm device art. The present invention constitutes an improvement over the mechanism described in that copending application, in that it is considerably more positive in action and furthermore in that it obviates the necessity of a pilot pin attached to the trunk lid, as is the case in the device shown previously. A still further improvement in the present invention is that the audible alarm is actuated instantaneously with the punching in of the lock.

It is a general object of the invention to provide a suitable alarm mechanism for use in connection with automotive vehicles and particularly in connection with the storage trunks thereof.

It is a further object of the invention to provide a mechanism of the type described which is sufficiently simple in construction to be commercially feasible.

It is a still further object of the invention to provide an alarm mechanism especially adapted for installation in the trunk of an automotive vehicle, which mechanism is operative to actuate an alarm signal upon displacement of the trunk lock by punching out or the like.

It is another object of the invention to provide a mechanism of the type described which may be readily adapted for installation on a wide variety of automobiles of different makes and models.

It is a still further object of the invention to provide an alarm mechanism of such construction as to be positive, reliable, and immediate in operation and easy to maintain.

Other and further objects of the invention will be apparent from the detailed description to follow.

In the drawings:

FIG. 1 is a fragmentary perspective view, largely schematic, showing the alarm of this invention installed in the trunk of an automotive vehicle;

FIG. 2 is a top view of the mechanism;

FIG. 3 is a view, partly in section, taken along line 3—3 of FIG. 2;

FIG. 4 is a side elevation, partly in section, taken along line 4—4 of FIG. 2;

FIG. 5 is a view similar to FIG. 4 showing the operating bar of the lock mechanism rotated at 90 degrees;

FIG. 6 is a side elevation, similar to FIGS. 4 and 5, and illustrating the movement of the key when the lock mechanism has been illicitly removed;

FIG. 7 is a fragmentary top view of the mechanism showing variation in the mounting position thereof;

FIG. 8 is a side elevation taken along line 8—8 of FIG. 7;

FIG. 11 is a perspective view, largely schematic showing an economical embodiment of the alarm of this invention with the key and cylindrical casing omitted.

Figure 9:
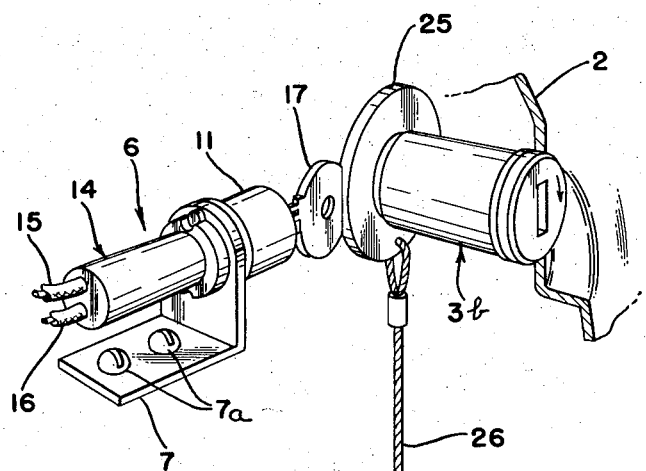
FIG. 9 is a fragmentary perspective view, largely schematic, illustrating the manner in which the alarm mechanism may be mounted for use in connection with a modified lock.

Experience has shown, generally speaking, that trunk lids are illicitly opened in one or the other of two ways. In many instances the lock is driven inwardly out of position by means of a punch or the like in order that the trunk lid may be released. As a variation of this same basic method, the lock may be removed from the trunk lid outwardly by means of a suitable pulling device. At other times, and particularly with some automobile models, the trunk lid may be sprung open or unlatched by a sharp blow delivered to a particular area of the trunk lid. The former method, that is punching inwardly or pulling outwardly, seems to be the one utilized by thieves in the vast majority of instances, and the alarm mechanism of this invention has been designed particularly to combat thefts perpetrated in this manner.

Referring now more particularly to the drawings, whereing like reference numerals are used throughout the several views to indicate like parts, I have shown a portion of an automobile trunk, includijng a trunk lid 1 and a sill wall 2. Mounted in the sill wall by any suitable means is a conventional tumbler set assembly 3. In accordance with usual practice, the tumbler set assembly 3 is interconnected with the trunk lid latch assembly 4 by means of operating bar 5, of generally rectangular cross section. Rotation of the key in the tumbler set 3 in turn causes rotation of the operating bar 5 and actuation of a latch assembly 4.

Mounted in the trunk cavity, adjacent the operating bar 5 and opposed to the lid 1 is my novel alarm mechanism indicated generally at 6. In the illustrated form of the invention, the alarm mechanism includes a suitable frame 7, generally L-shaped in form and disposed in such a way that one leg is generally horizontal and the other generally vertical. The frame 7 may be mounted upon a suitable bracket 8, or the like, attached to the automobile body by bolts 7a or other equivalent means.

Fixedly mounted within aperture 10 provided in the vertical leg of the frame 7 is a hollow cylindrical casing 11 closed at its free end by wall 12. A conventional keyhole 13 is provided in the central portion of the wall 12. Mounted against axial movement within the casing 11 is an electrical switch 14 connected by leads 15 and 16 to the horn of the automobile, or to any other suitable signalling means. Switch 14 is of the well known, normally closed (N.C.) type, such that when the spring biased button 9 is depressed, the circuit by which the switch is connected to the horn or other signal is open and when extended, the circuit is closed.

As will be observed, the button 9 is disposed generally along the axis of the cylindrical casing 11 so as to be engaged and held in the depressed position by the bridging means or key 17, which is slidably fitted within the key hole 13, as shown, for example in FIG. 4. The alarm mechanism 6 is so mounted within the trunk that the key 17 acts as a bridging means between the switch button 9 and the locking mechanism 3, 4, 5. When the lock mechanism is in its normal operative position, the bridging means or key 17 is pressed tightly against the button 9 to hold the horn circuit open.

When, as shown in FIGS. 1–5, the alarm mechanism is mounted between the tumbler 3 and the latch 4 in such a position that the bridging means or key 17 engages the rotatable operating bar 5 of the lock, care must be taken to insure the fact that the normal rotation of the operating bar as the trunk lock is operated will not permit sufficient movement of the key 17 to close the horn circuit. Normally, in switches of the type employed in connection with this invention, the switch button 9 can move outwardly, that is to the right in FIG. 4, a considerable extent before closing the circuit. Therefore, in order to insure the fact that the circuit to the alarm is not inadvertently actuated during the operation of the lock assembly 3, 4, 5, it is necessary merely to mount the switch 6 sufficiently close to the operating bar 5 so that as such bar rotates from horizontal to vertical, as seen in FIGS. 4 and 5, the total overall movement of the key 17 is not sufficient to allow the switch button 9 to move into fully open position.

FIGS. 7 and 8 indicate the manner in which my novel alarm mechanism may be mounted for cooperation with the tumbler set mechanism 3 itself rather than with the operating bar 5. When mounted in this position, of course, the operation of the lock assembly does not cause movement of the key 17a. Therefore, it is not necessary, when mounting as shown in these figures, to exercise the same degree of care necessary in selecting the mounting position relative to FIGS. 1–5. When the alarm mechanism is mounted as shown in FIGS. 7 and 8, the key 17a may be provided with an arcuate cut-out portion 20, if desired, of a shape to conform to the external periphery of the tumbler set 3, as best seen in FIG. 8.

Figure 10:
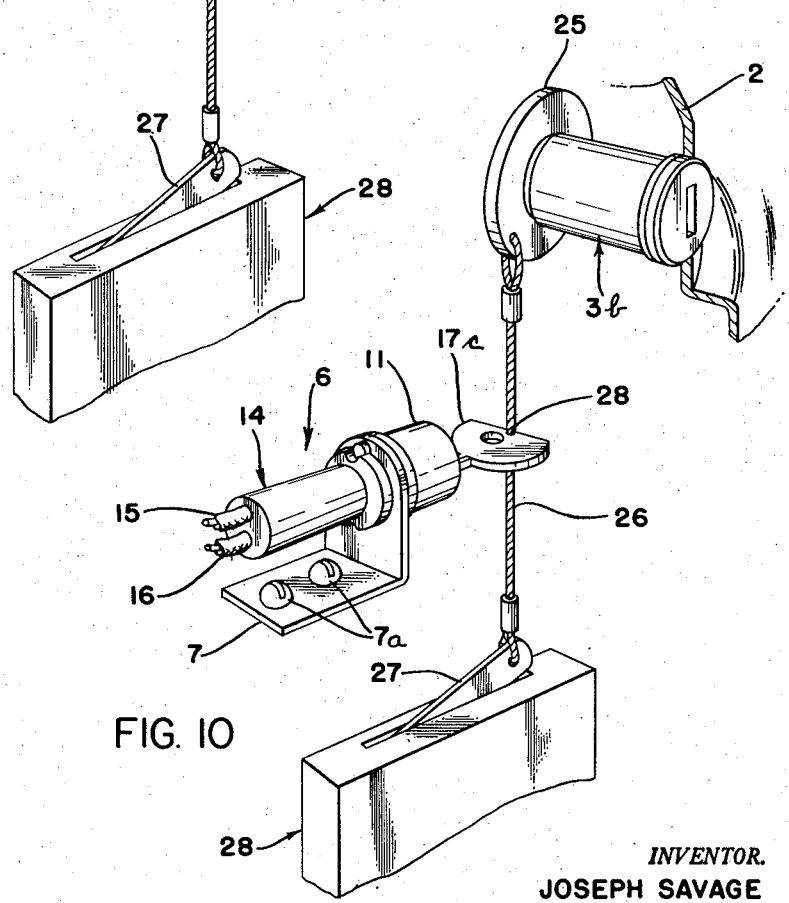
FIG. 10 is a fragmentary perspective view, largely schematic, showing the alarm mechanism with a slightly modified key, which may be used also in connection with the modified lock of FIG. 9.

In FIGS. 9 and 10, I have illustrated the manner in which the alarm mechanism of this invention may be utilized in conjunction with a modified lock design commonly used today with several popular automobile models. The modified lock shown in FIGS. 9 and 10 comprises essentially a tumbler set mechanism 3b, having at its inner end a flat, generally circular operating disk 25. Attached to the operating disk 25 at a position offset substantially from the center thereof is a cable 26. The lower end of the cable 26 is attached to an operating lever 27 comprising a part of the latch assembly 28. Operation of the tumbler set assembly 3b with the key causes rotation of the operating disk 25. This, in turn, exerts a pulling force on the cable 26 which rotates the operating lever 27 in a counterclockwise direction to cause operation of the latching mechanism 28.

FIGS. 9 and 10 illustrate two mounting techniques which may be employed when the alarm mechanism of this invention is utilized with a lock of the kind discussed in the immediately preceding paragraph. In the technique of FIG. 9, the alarm mechanism 6 is mounted in such a manner that the key 17 engages the edge of the rotatable operating disk 26.

FIG. 10 illustrates an alternative technique in which the alarm mechanism 6 is mounted so that bridging means of the key 17c engages the operating cable 26. If desired, the key 17c may be provided with a notch 28 within which a portion of the periphery of the operating cable 26 may be received.

Where the mounting technique shown in FIG. 10 is employed, some care must be exercised in positioning the alarm mechanism 6 relative to the operating cable 26. As will be observed, when the operating cable 26 moves from the position shown in FIG. 10, for example, to the position shown in FIG. 9, it will permit a certain degree of outward reciprocal movement of the key 17c relative to the switch 14. Accordingly, the alarm mechanism 6 must be positioned sufficiently close to the operating cable 26 so that the normal movements of the cable during the operation of the lock will not cause inadvertent closing of the switch 14 and resultant actuation of the alarm.

The operation of my device is extremely simple and has been illustrated in FIG. 6. It will be realized that because the switch button is normally biased outwardly, i.e., to the right as seen in FIGS. 4 and 6, it continually exerts a force against the key 17 tending to cause it to be ejected from the casing 11. Of course, as long as the key is in engagement with some portion of the lock assembly, such as the operating bar 5, as is the case in FIGS. 1–5; the tumbler set assembly 3, as in FIGS. 7 and 8; the operating disk 25, as in FIG. 9; or the operating cable 26, as in FIG. 10, the key is restrained from ejection. However, should the tumbler set assembly be punched inwardly or withdrawn outwardly from the trunk sill, the engagement between the key and one or more of the various components of the lock assembly will be broken, and the key will no longer be restrained. At this point, the biasing means for the switch button causes the button to move outwardly with the result that the key 17 is forcibly ejected from the keyhole 13. At the same time, the movement of the switch button 9 causes the circuit to the alarm to close.

It will be realized that usually the alarm mechanism 6 will be substantially enclosed by a suitable housing or the like, so that once the key 17 has fallen out of the keyhole 13 it will be difficult to find, particularly in view of the fact that the thief, upon hearing the alarm, will not be likely to waste much time searching. Because of the peculiar configuration of all keyholes it is difficult or impossible to pass screwdrivers, wires, or the like through them. It is for this reason that I have employed a key and a keyhole in connection with the invention, for once the key has been ejected the thief will not be able to force a screwdriver or other similar instrument through the keyhole 13 and into the casing 11 to depress the switch button 9 and open the alarm circuit.

It will be apparent from an examination of the working parts of the invention that in some instances the key 17, 17a, or 17c, together with the keyhole 13 and the cylindrical casing 11 may be omitted altogether in order that the button 9 may bear directly upon the lock means, i.e. tumbler set mechanism 3, the operating bar 5, the operating disc 25, or the cable 26, as the case may be. This arrangement, illustrated schematically in FIG. 11, provides a somewhat more economical alarm mechanism, subject, of course, to the liability that a potential thief might be able, if given sufficient time, to operate the switch button 9 manually. As will be obvious, when the button 9 bears directly on the lock means as described it will move into a portion of the space occupied by the lock means when the lock means is displaced and thereby limit access to the part of the latch which was cooperatively engaged by the lock means. Where the key and keyhole structure is employed, it is difficult, if not impossible, for the thief to operate the switch button because of the difficulty in forcing a screw driver or other instrument through the irregularly shaped keyhole as has been pointed out hereinabove.

While not necessary to the invention, a suitable switch means can, if desired, be concealed in the automobile itself in order that the owner may be able to break the alarm circuit easily once the same has been closed as a result of the attempt to illicitly open the automobile trunk.

It is obvious that the various components of the invention as herein described could be modified to a certain extent without at the same time departing from the true scope of the invention. It is, therefore, not my desire to be limited by the embodiments illustrated and described but rather to be limited only by the scope of the appended claims.

I claim:

1. In an alarm mechanism for an automotive vehicle provided with signal means, a compartment, a closure for the compartment, and a lock and latch for the compartment, at least components of the lock being illicitly displaceable for purposes of opening the compartment, the improvement comprising normally closed switch means mounted between portions of the lock and latch and laterally thereof, circuit means electrically interconnecting the switch means with the signal means, bridging means for holding the switch means open when the lock is in normal operative position, the bridging means being engaged with the switch means and with the illicitly removable components of the lock, and being operative upon illicit displacement of such components to permit closing of the switch means and resultant actuation of the signal means.

2. In an alarm mechanism for an automobile trunk having a lid and a lock and latch therefor, the improvement comprising signal means, normally closed switch means mounted between portions of said lock and latch and laterally thereof and having a spring-biased actuating button, casing means enclosing the actuating button and provided with an aperture adjacent the actuating button, bridging means extending through said aperture and normally maintaining the actuating button in depressed position, said bridging means being engaged with the lock for the trunk and being normally maintained thereby against movement away from the actuating button, whereby illicit displacement of the lock from its normal operative position breaks the engagement of the bridging means therewith, allowing the actuating button to move out of depressed position and close the circuit to the signal.

3. In an alarm mechanism for a motor vehicle compartment having a closure and lock means therefor, said lock means including as a component thereof a rotatable operating bar, the improvement comprising signal means, circuit closing means, electrical circuit means interconnecting said signal means and circuit closing means, said circuit closing means having a movable actuating member capable of opening the circuit, said member urged normally in a circuit-closed position, said member held by said rotatable operating bar in a circuit-open position whereby displacement of said rotatable operating bar from the normal operative position causes movement of said member into circuit-closed position to actuate said signal means.

4. In an alarm mechanism for a motor vehicle compartment having a closure and lock and latch means therefor operably connected to each other, the improvement comprising signal means, normally closed electrical switch means having a spring-biased actuating button slidably mounted therein between portions of said lock and latch means, electrical circuit means interconnecting said signal means and said switch means, means for fixedly securing said switch means with said button held in depressed position by said lock means and said circuit open whereby displacement of said lock means from its normal operative position causes the spring biased actuating button to move out of depressed position and into a portion of the spaced normally occupied by said lock means and thereby to close the circuit to the signal means.

5. In an alarm mechanism for a motor vehicle compartment having a closure and lock means therefor, said lock means including as a component thereof an operating cable, the improvement comprising signal means, circuit closing means, electrical circuit means interconnecting said signal means and circuit closing means, said circuit closing means capable of opening the circuit by actuation of a button, said button normally in position to close said circuit, said button held in position to open the circuit by said operating cable whereby displacement of the operating cable moves said button in position to close said circuit and actuate said signal means.

6. In an alarm mechanism for a motor vehicle compartment having a closure and lock means therefor said lock means including as a component thereof a tumbler set assembly, the improvement comprising signal means, circuit closing means, electrical circuit means interconnecting said signal means and circuit closing means, said circuit closing means capable of opening the circuit by actuation of a button, said button normally in position to close said circuit, said button held in position to open the circuit by said tumbler set assembly whereby displacement of the tumbler set assembly moves said button in position to close said circuit and actuate said signal means.

7. In an alarm mechanism for an automobile trunk having a lid, lock means and latch means having a part cooperatively engaging a part of the lock means, the improvement comprising signal means, normally closed switch means having a spring biased actuating member and enclosing means having an opening in which said member is mounted for movement, an electrical circuit interconnecting said signal means and switch means, said switch means mounted adjacent said lock means and said latch means, said member held in a first position by said lock means to maintain said switch means open whereby displacement of the lock means from its normal operating position causes the member to move from the first position into a portion of the space occupied by the lock means when in its normal operating position thereby closing the circuit to the signal means and obstructing access to the latch part which normally cooperatively engages a part of the lock means.

8. In an alarm mechanism for an automobile trunk having a lid, lock means and latch means therefor, the improvement comprising signal means, normally closed switch means mounted between portions of said lock means and latch means having a spring-biased actuating button and enclosing means having a bore in which said button is mounted for spring-biased sliding movement, an electrical circuit interconnecting said signal means and said switch means, said switch means mounted with said button held in depressed position in the bore of said enclosing means by said lock means to maintain said switch means open, whereby displacement of the lock means from its normal operative position causes the spring-biased actuating button to move out of depressed position into a portion of the space previously occupied by said lock means and thereby to close the circuit to the signal means.

9. In an alarm mechanism for an automotive vehicle provided with signal means, a compartment, a closure for the compartment, a lock for the compartment, at least components of the lock being illicitly displaceable for purposes of opening the compartment, the improvement comprising normally closed switch means, circuit means electrically connecting the switch means with the signal means, bridging means comprising a keylike member engaging at one end the switch and normally holding the same open and engaging at the other end at least one of said illicitly displaceable components, and being operative on illicit displacement of such component to permit closing of the switch means and resultant actuation of the signal means.

10. In an alarm mechanism for an automobile trunk having a lid and a lock therefor, the improvement comprising signal means, normally closed switch means having a spring-biased actuating button, casing means enclosing the actuating button and provided adjacent the actuating button with an aperture having a keyhole-like configuration, bridging means extending through said aperture and configured to slide therein normally maintaining the actuating button in depressed position, said bridging means being engaged with the lock for the trunk and being normally maintained thereby against movement away from the actuating button, whereby illicit displacement of the lock from its normal operative position breaks the engagement of the bridging means therewith, allowing the actuating button to move out of depressed position and close the circuit to the signal.

11. In an alarm mechanism for an automobile trunk having a lid and lock therefor, the improvement comprising signal means, normally closed switch means having a spring-biased actuating button, casing means enclosing the actuating button and provided with an aperture adjacent the actuating button, bridging means extending through said aperture and normally maintaining the actuating button in depressed position, said bridging means being engaged with the lock for the trunk and being normally maintained thereby against movement away from the actuating button, whereby illicit displacement of the lock from its normal operative position breaks the engagement of the bridging means therewith allowing the actuating button to move out of depressed position, thereby to cause the bridging means to be ejected from the aperture and close the circuit to the signal.

References Cited in the file of this patent
UNITED STATES PATENTS

| | | |
|---|---|---|
| 1,399,170 | Vandevelde | Dec. 6, 1921 |
| 1,674,570 | Re | June 19, 1928 |
| 2,818,475 | Harry | Dec. 31, 1957 |